H. B. ENOS.
TRACTION DEVICE.
APPLICATION FILED JULY 20, 1921.
1,432,167.   Patented Oct. 17, 1922.
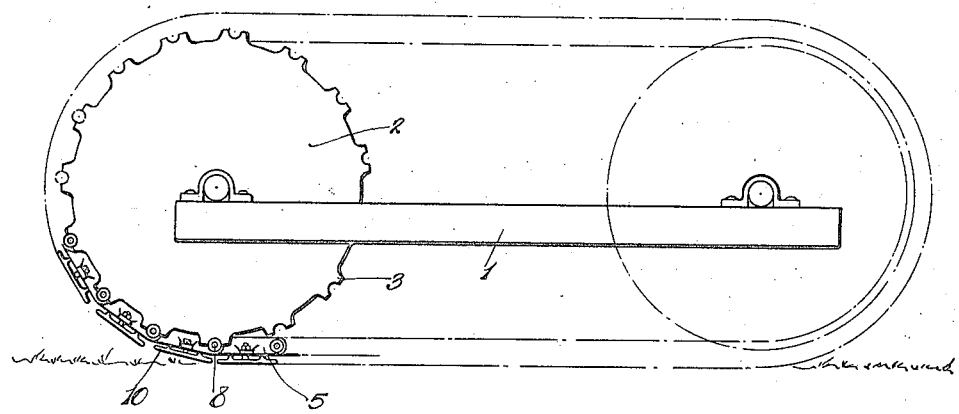
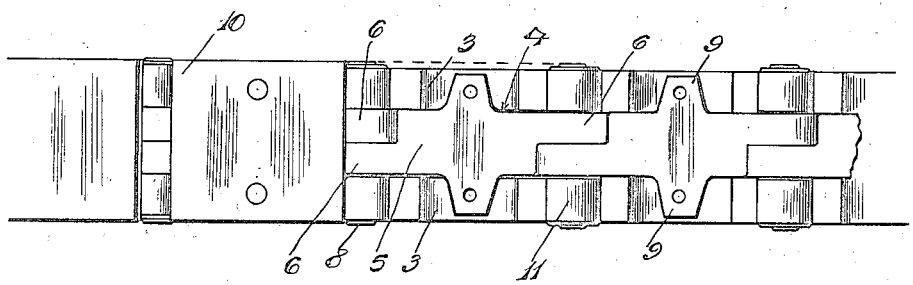
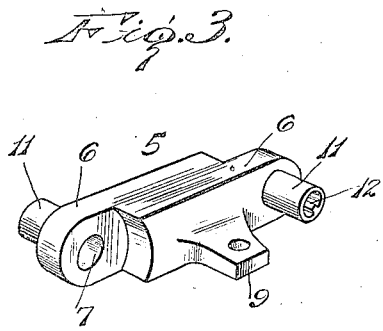
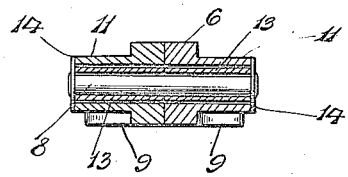
Inventor
H. B. Enos.
By Lacey & Lacey, Attorneys Patented Oct. 17, 1922.

1,432,167

UNITED STATES PATENT OFFICE.

HENRY B. ENOS, OF SANTA MARIA, CALIFORNIA.

TRACTION DEVICE.

Application filed July 20, 1921. Serial No. 486,196.

*To all whom it may concern:*

Be it known that I, HENRY B. ENOS, a citizen of the United States, residing at Santa Maria, in the county of Santa Barbara and State of California, have invented certain new and useful Improvements in Traction Devices, of which the following is a specification.

This invention relates to tractors of the endless chain type and seeks to provide a construction in which the frictional resistance and wear between the moving parts will be minimized, a particular object of the invention being to provide a construction in which the endless chain may be arranged in the central vertical plane of the driving sprocket wheel and the use of a single chain of links permitted, thereby dispensing with one endless chain now generally employed and permitting a substantial reduction in the width of the driving sprocket without any loss of efficiency. The invention is illustrated in the accompanying drawings and will be hereinafter fully set forth.

In the drawings—

Figure 1 is a side elevation of a portion of a traction device embodying my improvements;

Fig. 2 is an enlarged bottom plan view of the same;

Fig. 3 is a detail perspective view of one of the links;

Fig. 4 is a transverse section taken through the pivotal connection between adjacent links.

Traction devices of the class to which my invention applies consist of endless chains carrying ground-engaging members and trained around spaced wheels, one of which must be an actuating sprocket. In actual use, both wheels are generally in the form of sprockets but such construction is not absolutely essential. The shafts of these wheels are held in a fixed spaced relation by the frame of the machine, a portion of which is indicated at 1 in the accompanying drawing, and in the said drawing, 2 designates the actuating sprocket which is provided with recessed lugs or teeth 3 upon its periphery, the said lugs or teeth being transversely grooved to accommodate the joint between the links of the traction device and being centrally recessed, as indicated at 4, Fig. 2, to receive the intermediate portions of the said links. The traction device comprises an endless chain of links 5 which are constructed at their opposite ends with offset extensions 6 adapted to overlap and provided with transverse openings 7 therethrough, pivot pins 8 being inserted through the registering openings of adjacent links whereby to connect the links in an obvious manner. Intermediate their ends, the links are each provided with lateral lugs 9 to which the feet or tread plates 10 are rigidly secured. Upon the outer side face of each extension 6 is a lateral cylindrical lug 11 axially alined with the opening 7 through the said extension and having a longitudinal rib 12 upon its inner surface. Within each cylindrical lug 11 is disposed a bushing 13, the bushing being provided with an external longitudinal groove adapted to engage the said rib 12 whereby the bushing will be keyed within the cylindrical lug. The axially alined bushings fit around the pivot pins 8, as shown most clearly in Fig. 4, so that the wear is received by the bushings which may be very easily and cheaply replaced whenever the wear becomes excessive. In assembling the device, the body portions of the links fit within the recesses 4 of the sprocket and the lateral lugs 11 engage within the transverse grooves of the sprockets 3 so that rotation of the driving sprocket wheel will actuate the links and effect propulsion in a well-known manner. It will be readily noted that the engagement of the longitudinal body portions of the links within the central recesses upon the sprockets serve to maintain the proper alinement of the links while reducing the surfaces in contact, and the tread plates 10 may, of course, be of any desired width so that the area in contact with the ground may be just as wide and as effective as is the case when two parallel endless chains are employed as is the more general arrangement. Cap plates or washers 14 are provided upon the ends of the pivots 8 so as to retain the bushing and the pivots in proper position within the overlapping ends of the links and these washers or cap plates may be easily removed when renewal of the bushings becomes necessary. My improved traction chain is very simple and may be produced at a low cost while the expense of upkeep will be minimized and the dead weight imposed upon the machine to which the invention is applied will be very materially reduced.

Having thus described the invention, what is claimed as new is:

In a traction device, the combination of a sprocket wheel provided upon its periphery with teeth having transverse grooves in their outer sides and spaced transversely of the wheel from similar transversely alined teeth, an endless chain consisting of links having their body portions disposed longitudinally of the wheel to engage within the spaces between successive teeth on the wheel and provided with offset longitudinal extensions at their ends on their opposite sides, the offsets on the meeting ends of adjacent links overlapping, lateral cylindrical lugs on the outer sides of said extensions adapted to engage the transverse grooves in the teeth on the sprocket wheel, lateral lugs on the sides of the links to project between successive teeth on the sprocket wheel, pivot pins inserted through the overlapping extensions at the meeting ends of adjacent links and through the cylindrical lugs on said extensions, and traction plates secured to the lugs on the sides of the links.

In testimony whereof I affix my signature.

HENRY B. ENOS. [L. S.]